United States Patent
Tomooka

(10) Patent No.: US 10,860,157 B2
(45) Date of Patent: Dec. 8, 2020

(54) CAPACITIVE TOUCH PANEL

(71) Applicant: SEKISUI POLYMATECH CO., LTD., Saitama (JP)

(72) Inventor: Shinichi Tomooka, Saitama (JP)

(73) Assignee: SEKISUI POLYMATECH CO., LTD., Saitama (JP)

(*) Notice: Subject to any disclaimer, the term of this patent is extended or adjusted under 35 U.S.C. 154(b) by 0 days.

(21) Appl. No.: 16/628,403

(22) PCT Filed: Jul. 4, 2018

(86) PCT No.: PCT/JP2018/025292
§ 371 (c)(1),
(2) Date: Jan. 3, 2020

(87) PCT Pub. No.: WO2019/009315
PCT Pub. Date: Jan. 10, 2019

(65) Prior Publication Data
US 2020/0218401 A1    Jul. 9, 2020

(30) Foreign Application Priority Data
Jul. 5, 2017    (JP) .................................. 2017-132139

(51) Int. Cl.
G06F 3/044    (2006.01)
G06F 3/041    (2006.01)

(52) U.S. Cl.
CPC .......... *G06F 3/0446* (2019.05); *G06F 3/0412* (2013.01)

(58) Field of Classification Search
None
See application file for complete search history.

(56) References Cited

U.S. PATENT DOCUMENTS 9,715,314 B2 *   7/2017   Westhues .............. G06F 3/044
2011/0102361 A1  5/2011   Philipp
(Continued)

FOREIGN PATENT DOCUMENTS

JP    2010039537 A    2/2010
JP    2012079238 A    4/2012
(Continued)

OTHER PUBLICATIONS

International Search Report (PCT/ISA/210) dated Sep. 11, 2018, by the Japanese Patent Office as the International Searching Authority for International Application No. PCT/JP2018/025292.

*Primary Examiner* — Krishna P Neupane
(74) *Attorney, Agent, or Firm* — Buchanan, Ingersoll & Rooney PC

(57) ABSTRACT

A touch panel includes a insulator, X electrodes arranged on one insulator surface and each including X lines, Y electrodes arranged on another insulator and each including Y lines, X auxiliary lines each connecting adjacent X lines, and Y auxiliary lines each connecting adjacent Y lines. The auxiliary lines are located on diagonals of cells L, defined by the X lines and the Y lines and arranged in rows and columns. The X and Y auxiliary lines are arranged without overlapping or being superposed on each other. Each of the rows and columns includes at least one cell having either the X or Y auxiliary lines and at least one cell having neither the X or Y auxiliary lines. The rows include no row that has neither the X or Y auxiliary lines, and the columns include no column that has neither the X nor the Y auxiliary lines.

9 Claims, 13 Drawing Sheets

(56) References Cited

U.S. PATENT DOCUMENTS

| | | | |
|---|---|---|---|
| 2011/0102370 A1* | 5/2011 | Kono | H03K 17/9622 |
| | | | 345/174 |
| 2013/0161070 A1* | 6/2013 | Lee | H05K 3/105 |
| | | | 174/250 |
| 2014/0360856 A1* | 12/2014 | Mizumoto | H05K 1/0213 |
| | | | 200/600 |
| 2015/0002464 A1 | 1/2015 | Nishioka et al. | |
| 2015/0070599 A1 | 3/2015 | Tomooka et al. | |
| 2015/0212537 A1* | 7/2015 | Cok | G06F 3/0416 |
| | | | 345/174 |
| 2016/0216806 A1* | 7/2016 | Nakamura | G06F 3/044 |
| 2017/0017335 A1 | 1/2017 | Takahashi | |
| 2017/0139509 A1 | 5/2017 | Nishioka et al. | |
| 2019/0377457 A1* | 12/2019 | Nakayama | G06F 3/0445 |

FOREIGN PATENT DOCUMENTS

| | | |
|---|---|---|
| JP | 5734504 B2 | 6/2015 |
| JP | 2015165377 A | 9/2015 |
| JP | 2016126730 A | 7/2016 |
| WO | 2013180143 A1 | 12/2013 |
| WO | 2013187324 A1 | 12/2013 |
| WO | 2015146277 A1 | 10/2015 |

\* cited by examiner

CAPACITIVE TOUCH PANEL

TECHNICAL FIELD

The present invention relates to a capacitive touch panel that can be used as an electrostatic sensor, for example.

BACKGROUND ART

Capacitive touch panels incorporated in, for example, smartphones, include indium tin oxide (ITO), which is transparent and exhibits a relatively low resistance, as a material for electrodes. One of such capacitive touch panels known in the art is disclosed in, for example, International Publication No. 2013/180143 (PTL 1). Disadvantageously, ITO is expensive because it is rare metal, and is sensitive to bending. For example, International Publication No. 2013/187324 (PTL 2) discloses another known capacitive touch panel including an electrode layer made of PEDOT/PSS, which is advantageously inexpensive and is resistant to bending. Disadvantageously, PEDOT/PSS, which is inferior in transparency and resistance to ITO, is used for limited applications, such as a touch switch. Unfortunately, PEDOT/PSS included in sensors incorporated in a large device to be operated on a large screen may lead to degradation of functions of the sensors because this material exhibits high resistance.

To solve the above-described problem, a metal material, such as silver paste, can be used for electrodes. Although a wiring pattern made of silver paste is easily identified visually because silver does not transmit light, a width of approximately 30 µm or less of fine lines included in the wiring pattern makes it difficult to visually identify the fine lines. However, as the fine lines have a smaller width, the lines are more likely to be broken. For example, Japanese Patent No. 5734504 (PTL 3) discloses a technique in which multiple fine lines are combined into bundles of wiring lines, or wiring line bundles, in order to prevent the fine lines from being broken.

CITATION LIST

Patent Literature

PTL 1: International Publication No. 2013/180143
PTL 2: International Publication No. 2013/187324
PTL 3: Japanese Patent No. 5734504

SUMMARY OF INVENTION

Technical Problem

Although the technique disclosed in Japanese Patent No. 5734504 (PTL 3) is to combine the fine lines into the wiring line bundles, each of the fine lines is a long continuous wiring line extending across a panel. In such a configuration, any of the fine lines is likely to be broken and each of the fine lines may be broken. A typical capacitive touch panel includes a plurality of fine lines arranged in X and Y directions and forming a mesh pattern. Unfortunately, such a configuration tends to cause a moiré pattern.

The present invention has been made in consideration of the above-described disadvantages and is intended to overcome the disadvantages. In other words, the present invention aims to provide a capacitive touch panel in which the likelihood that a detection failure may be caused by breaking of a line is eliminated and a moiré pattern is unlikely to be seen.

Solution to Problem

A capacitive touch panel according to the present invention intended to overcome the disadvantages can be configured as follows.

The present invention provides a capacitive touch panel including a transparent insulator, a plurality of conductive X electrodes spaced in a row direction on a first surface of the transparent insulator, and a plurality of conductive Y electrodes spaced in a column direction on a second surface of the transparent insulator. The X electrodes each include a plurality of X fine lines spaced in the row direction. The Y electrodes each include a plurality of Y fine lines spaced in the column direction. The X fine lines and the Y fine lines define a large number of quadrangular cells arranged in a matrix of rows and columns in the transparent insulator when the transparent insulator is viewed in plan. The capacitive touch panel further includes an X auxiliary line disposed on a diagonal of at least one of the cells included in each row of the matrix and connecting the X fine lines that are adjacent to each other and a Y auxiliary line disposed on a diagonal of at least one of the cells included in each column of the matrix and connecting the Y fine lines that are adjacent to each other.

According to the present invention, the X auxiliary line connects the adjacent X fine lines and the Y auxiliary line connects the adjacent Y fine lines. Thus, the X auxiliary line and the Y auxiliary line reliably provide a conduction path if any of the X fine lines and any of the Y fine lines are broken. This reduces the likelihood that a conduction failure may be caused by breaking of any of the X fine lines and any of the Y fine lines.

If the X fine lines arranged on a first surface (e.g., a front surface) of a base sheet and the Y fine lines arranged on a second surface (e.g., a rear surface) of the base sheet were placed in a superposed manner to define a large number of cells, a moiré pattern would be likely to occur. The occurrence of a moiré pattern would allow the X fine lines and the Y fine lines to be visible, leading to a deterioration in appearance of a capacitive touch panel. In contrast, according to the present invention, at least one of the cells included in each row of the matrix has the X auxiliary line on its diagonal. In addition, at least one of the cells included in each column of the matrix has the Y auxiliary line on its diagonal. The X auxiliary line and the Y auxiliary line provide irregularity to a regular, matrix-shaped wiring pattern formed by the X and Y fine lines, thus reducing the likelihood of occurrence of a moiré pattern.

Furthermore, according to the present invention, it is only required that the X fine lines and the X auxiliary lines are arranged on the first surface of the transparent insulator and the X fine lines and the X auxiliary lines are arranged on the second surface of the transparent insulator. This enables inexpensive production of the capacitive touch panel.

The X auxiliary line and the Y auxiliary line may be arranged in different cells of the cells.

If the X auxiliary line and the Y auxiliary line were arranged in an overlapping manner or a superposed manner in the same cell when the transparent insulator is viewed in plan (or viewed in a thickness direction of the transparent insulator), wiring parts corresponding to the X auxiliary line and the Y auxiliary line would appear clearly visible and could be more easily seen than parts with no X fine lines, no Y fine lines, no X auxiliary lines, and no Y auxiliary lines. In contrast, according to the present invention, the X auxiliary line and the Y auxiliary line are arranged in different cells. Thus, the capacitive touch panel in which the X auxiliary lines and the Y auxiliary lines are inconspicuous in appearance can be provided.

The X electrodes and the Y electrodes may include at least one of a dummy X auxiliary line that is disposed on a diagonal of the cell having neither the X auxiliary line nor the Y auxiliary line located between adjacent X fine lines of the X fine lines of different X electrodes of the X electrodes and that does not bring the adjacent X fine lines into conduction with each other and a dummy Y auxiliary line that is disposed on a diagonal of the cell having neither the X auxiliary line nor the Y auxiliary line located between adjacent Y fine lines of the Y fine lines of different Y electrodes of the Y electrodes and that does not bring the adjacent Y fine lines into conduction with each other.

In the capacitive touch panel according to the present invention, at least the X electrodes include a dummy X auxiliary line or at least the Y electrodes include a dummy Y auxiliary line. The dummy X auxiliary line does not function as a conduction path for the X fine lines because it does not bring the adjacent X fine lines into conduction with each other, and the dummy Y auxiliary line does not function as a conduction path for the Y fine lines because it does not bring the adjacent Y fine lines into conduction with each other. Each of the dummy X auxiliary line and the dummy Y auxiliary line is disposed on a diagonal of the cell. If it is difficult to reduce the likelihood of occurrence of a moiré pattern by using the X auxiliary lines and the Y auxiliary lines, arranging the dummy X auxiliary line and the dummy Y auxiliary line can reduce the likelihood of occurrence of a moiré pattern.

The X auxiliary line, the Y auxiliary line, the dummy X auxiliary line, and the dummy Y auxiliary line may be arranged on the diagonals of different cells of the cells.

According to the present invention, the X auxiliary line, the Y auxiliary line, the dummy X auxiliary line, and the dummy Y auxiliary line are arranged such that they are not superposed on each other when the transparent insulator is viewed in plan (or viewed in the thickness direction of the transparent insulator). This arrangement eliminates the likelihood that these lines in superposed relation with each other appear clearly visible and can be easily seen. Thus, the capacitive touch panel in which the X auxiliary lines, the Y auxiliary lines, the dummy X auxiliary line, and the dummy Y auxiliary line are inconspicuous in appearance can be provided.

The cells on upper, lower, right, and left sides of each cell having the X auxiliary line or the Y auxiliary line may have neither the X auxiliary line nor the Y auxiliary line.

In such a configuration of the capacitive touch panel, the cells on the upper, lower, right, and left sides of each cell having the auxiliary line have no auxiliary line, this configuration reduces the likelihood that a conduction failure may be caused by breaking of a fine line and also reduces the likelihood of occurrence of a moiré pattern. Furthermore, according to the present invention, the cells having neither the X auxiliary line nor the Y auxiliary line lead to an increased aperture ratio of the capacitive touch panel, thus improving viewability of the capacitive touch panel. The term "aperture ratio" as used herein will be described in detail later with reference to FIG. 7. The term "viewability" as used herein refers to inconspicuousness of the fine lines included in the X electrodes and the Y electrodes, and is used to express the extent to which the fine lines appear clearly visible, the extent to which the lines appear thick, and the presence or absence of, for example, black dots. Specifically, as the viewability is better, a wiring pattern including the X electrodes and the Y electrodes is less likely to be visually identified. As the viewability is worse, the wiring pattern is more likely to be seen.

The X auxiliary line and the Y auxiliary line may be arranged on the diagonals, each of which is one of two diagonals of the cell, extending in an identical direction.

In such a configuration of the capacitive touch panel, the X auxiliary line and the Y auxiliary line are arranged on the diagonals, each of which is one of the two diagonals of the cell, extending in the identical direction. This configuration facilitates design of the auxiliary lines.

Each of the X fine lines and the Y fine lines may be shaped like a wave having an amplitude and a wavelength that is more than two times as long as the amplitude, and a tangent to the wave and a center line of the wave may form a maximum angle of less than 45°.

In such a configuration according to the present invention, the X fine lines and the Y fine lines have a substantial length longer than those of straight X and Y fine lines, whereas the X fine lines and the Y fine lines have a substantial length shorter than those of X and Y fine lines shaped such that the above-described maximum angle exceeds 45°. This configuration reduces the probability of breaking of a line. Furthermore, a reduction in length of the X and Y fine lines is achieved, leading to a reduction in resistance. Additionally, the wave-like shape of the X and Y fine lines enables the likelihood of occurrence of a moiré pattern to be lower than that in a case where the X and Y fine lines are straight lines.

The X fine lines may be located at positions spaced from each other in the row direction, and the Y fine lines may be located at positions spaced from each other in the column direction.

In such a configuration, the X fine lines are located at positions spaced from each other in the row direction, and the Y fine lines are located at positions spaced from each other in the column direction. This arrangement forms the cells having a quadrangular shape, which facilitate detection of a capacitance in the capacitive touch panel.

The X electrodes and the Y electrodes may be screen-printed products.

In such a configuration, the X electrodes and the Y electrodes are screen-printed products. This configuration allows a conductive material as much as needed to be applied to locations necessary to form a wiring pattern. This results in a reduction in amount of conductive material discarded. Furthermore, once a printing plate for a pattern of a screen-printed product is made, the screen-printed products can be made by repeating printing of the pattern. The pattern can be formed in a process simpler than, for example, photolithography involving a large number of steps.

The capacitive touch panel can be configured to detect a touch of, for example, a finger, based on a change in capacitance. The capacitive touch panel according to the present invention, which is capable of sensing a slide of a finger on its surface and a simultaneous multi-touch operation, can sense a variety of touches and thus outperforms a resistive touch panel, which is not capable of sensing a slide of a finger on its surface and multiple touches. The resistive touch panel, which requires a pair of films and a pair of conductive films, has disadvantages in that the cost of materials is high and the design is complex. In contrast, the capacitive touch panel according to the present invention does not have such disadvantages.

Advantageous Effects of Invention

According to the present invention, the capacitive touch panel in which the likelihood that a detection failure may be caused by breaking of a line is eliminated and a moiré pattern is unlikely to be seen can be provided.

DESCRIPTION OF EMBODIMENTS

Capacitive touch panels according to embodiments of the present invention will be described in detail. A redundant description of, for example, components, materials, making methods, and effects common to the embodiments is avoided.

First Embodiment [FIGS. 1 to 7]

Figure 1:
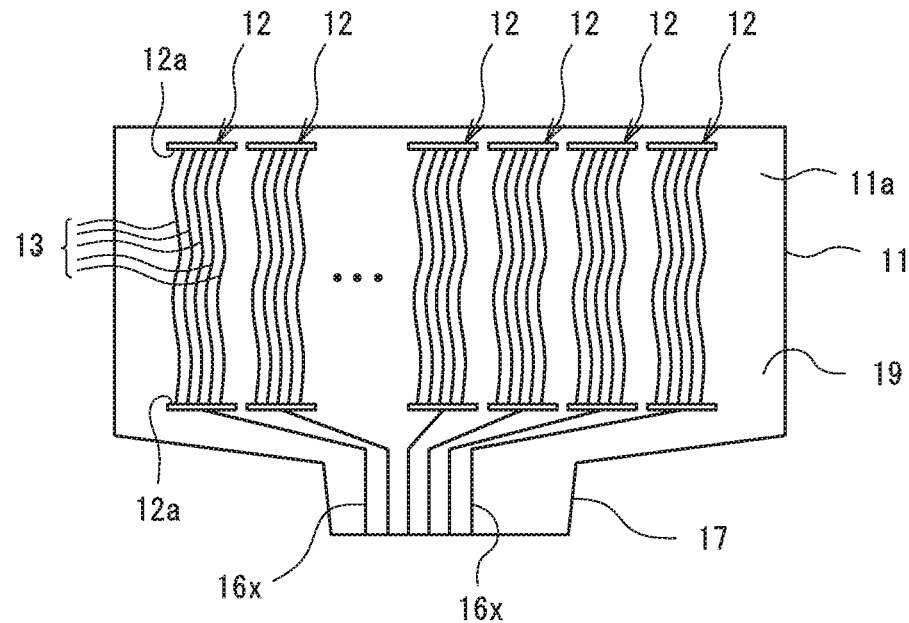
FIG. 1 is a schematic plan view illustrating X electrodes arranged on a base film.
Figure 2:
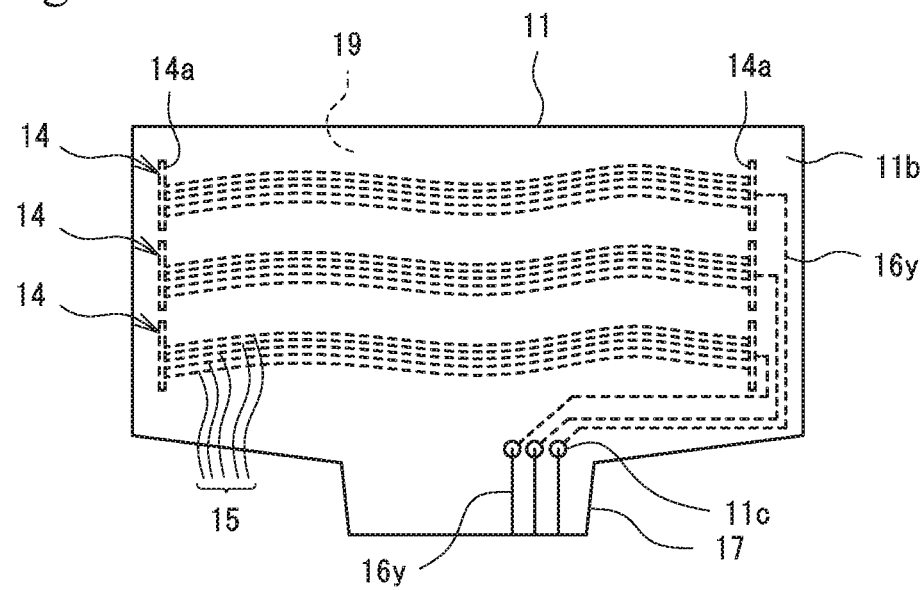
FIG. 2 is a schematic plan view illustrating Y electrodes arranged on the base film.
Figure 3:
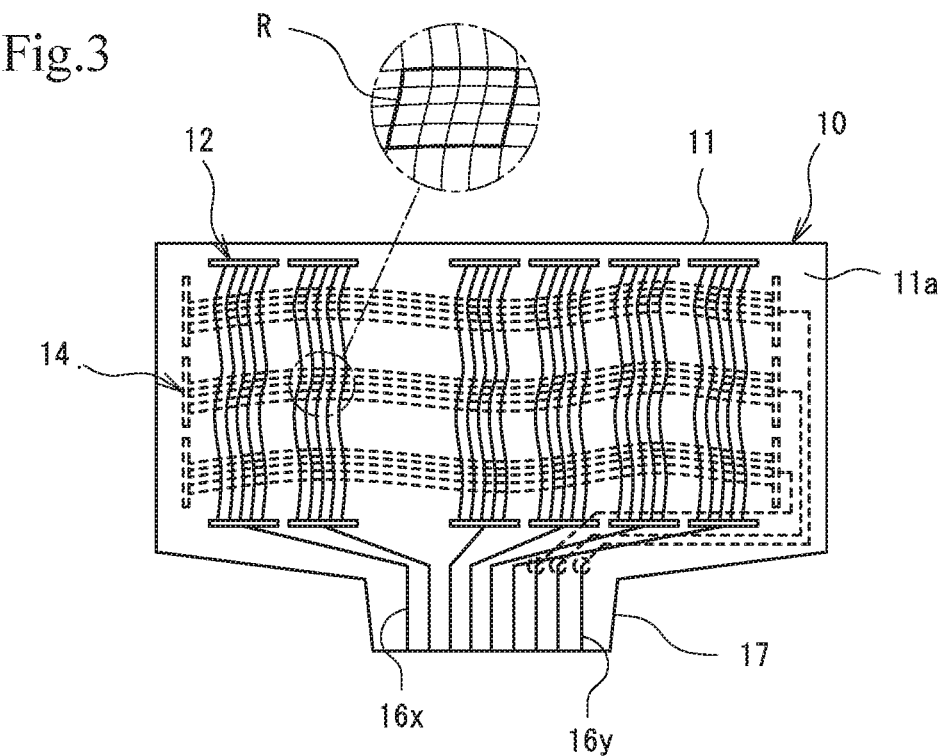
FIG. 3 includes a schematic plan view illustrating the X electrodes and the Y electrodes arranged on the base film.

FIGS. 1 to 3 are schematic plan views illustrating a capacitive touch panel 10 according to the present invention. FIG. 1 illustrates a plurality of X electrodes 12 arranged on a front surface 11a, serving as a "first surface", of a base film 11, serving as a "transparent insulator", which is a transparent PET film. FIG. 2 illustrates a plurality of Y electrodes 14 arranged on a rear surface 11b, serving as a "second surface", of the base film 11. FIG. 3 illustrates the capacitive touch panel 10 according to the present invention including the X electrodes 12 arranged on the front surface 11a of the base film 11 and the Y electrodes 14 arranged on the rear surface 11b.

Referring to FIG. 1, the X electrodes 12 are arranged in six columns such that the X electrodes 12 are spaced in a row direction (lateral direction). Each of the X electrodes 12 is a bundle of five X fine lines 13 extending in a column direction (longitudinal direction). The five X fine lines 13 are connected to connecting members 12a located at opposite ends of the lines, so that the fine lines are in electrical communication with each other. Although FIG. 1 illustrates six X electrodes 12, it is preferred to arrange approximately 30 X electrodes (in 30 rows). Wiring lines 16x extend from the X electrodes 12 to a connector contact 17.

FIG. 2 illustrates the Y electrodes 14 arranged on the rear surface 11b of the base film 11. The Y electrodes 14 are arranged in three rows such that the Y electrodes are spaced in the column direction (longitudinal direction). Each of the Y electrodes 14 includes a bundle of five Y fine lines 15 extending in the row direction (lateral direction). The five Y fine lines 15 are connected to connecting members 14a located at opposite ends of the fine lines, so that the fine lines are in electrical communication with each other. Although FIG. 2 illustrates three Y electrodes 14, it is preferred to arrange approximately 19 Y electrodes (in 19 rows). Wiring lines 16y of the Y electrodes 14 extend from the rear surface 11b of the base film 11 to the front surface 11a through through-holes 11c extending through the base film 11. Like the wiring lines 16x, the wiring lines 16y extend to the connector contact 17. For the sake of convenience, the Y fine lines 15 are depicted as broken lines in FIG. 2 so that the Y fine lines 15 can be distinguished from the X fine lines 13. The actual Y fine lines 15 are continuous fine lines instead of broken lines.

FIG. 3 illustrates the capacitive touch panel 10 according to the present invention including the X electrodes 12 arranged on the front surface 11a of the base film 11 and the Y electrodes 14 arranged on the rear surface 11b of the base film 11. FIG. 3 illustrates the front surface 11a of the base film 11, which is transparent. As used herein, the term "sensor region R" (for example, a portion surrounded by a thick line in a partial enlarged view included in FIG. 3) refers to a region where one X electrode 12 intersects one Y electrode 14. In this case, the capacitive touch panel 10 has in total 570 sensor regions R defined by the X electrodes 12 arranged in 30 columns and the Y electrodes 14 arranged in 19 rows. The capacitive touch panel 10 includes a transparent resist layer 19, serving as a resist coating, on each of the front surface 11a and the rear surface 11b. The resist layer 19 protects the capacitive touch panel 10 from scratching and shields the capacitive touch panel 10 from the effects of external radio waves and static electricity to maintain the sensing accuracy of the capacitive touch panel 10. For the sake of convenience, the Y fine lines 15 in FIG. 3 are depicted as broken lines so that the Y fine lines 15 can be distinguished from the X fine lines 13. The actual Y fine lines 15 are continuous fine lines instead of broken lines.

Figure 4:
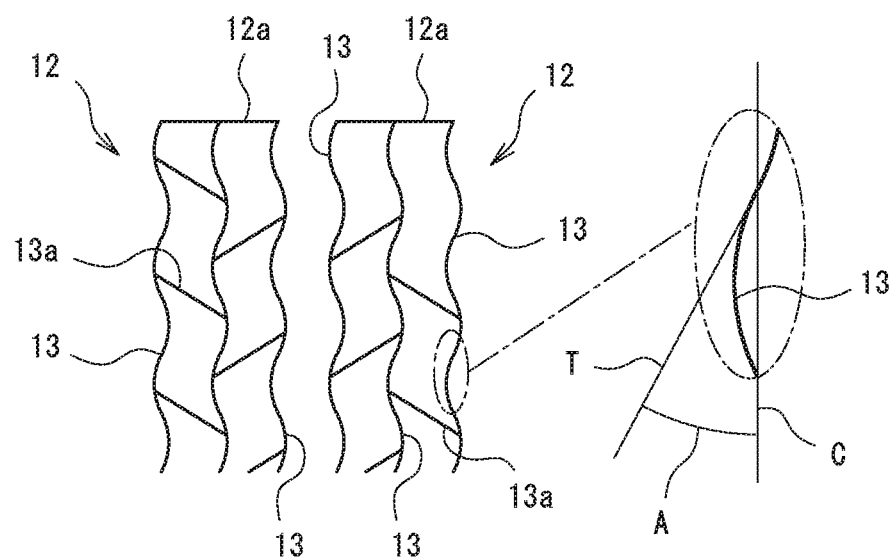
FIG. 4 includes partial enlarged plan views of the X electrodes.

FIG. 4 includes enlarged views of the X electrodes 12. FIG. 4 illustrates exemplary X electrodes 12 each including three X fine lines 13, and illustrates first ends of two adjacent X electrodes 12. Each of the X fine lines 13 is shaped like a wave having an amplitude and a wavelength that is approximately 12 times as long as the amplitude. As illustrated in a partial enlarged view included in FIG. 4, a maximum angle A formed by a tangent T to the wave of each X fine line 13 and a center line C of the wave is less than 45°. The three X fine lines 13 are aligned in the row direction and have identical shapes (spaced from each other in the row direction) such that wave peaks are aligned. Although FIGS. 1 to 3 illustrate the X electrodes 12 each including five X fine lines 13 and the Y electrodes 14 each including five Y fine lines 15, FIG. 4 and the subsequent figures illustrate the X electrodes 12 each including three X fine lines 13 and the Y electrodes 14 each including three Y fine lines 15 for convenience of description. As described above, each X electrode 12 may include any number of X fine lines 12 and each Y electrode 14 may include any number of Y fine lines 15.

Each X electrode 12 includes a plurality of X auxiliary lines 13a connecting adjacent X fine lines 13 such that the X auxiliary lines 13a are arranged between the three X fine lines 13. The X fine lines 13 are wave-like or wavy lines, whereas the X auxiliary lines 13a are straight lines. The X auxiliary lines 13a each connect the adjacent X fine lines 13. This ensures conduction of the X electrode 12 if at least part of the X fine lines 13 is broken. The X auxiliary lines 13a are not arranged between two adjacent X fine lines 13 that are included in different X electrodes 12. The reason is as follows. If the X auxiliary lines 13a were arranged between these X fine lines 13, the different X electrodes 12 would be brought into conduction with each other, so that position detection for each X electrode 12 might fail.

Figure 5:
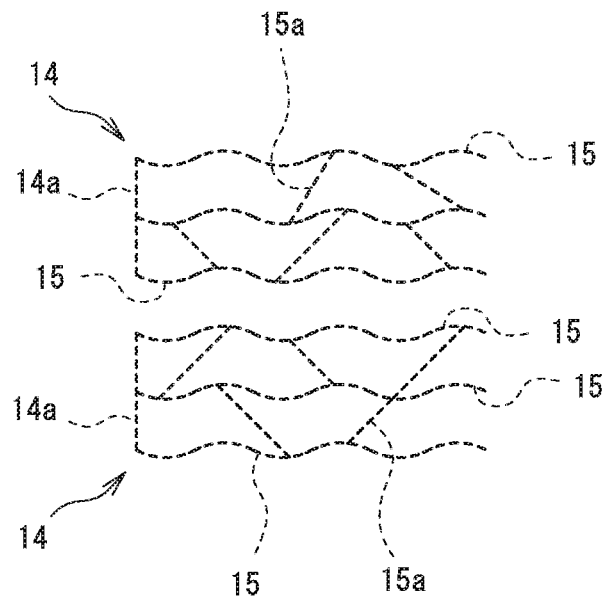
FIG. 5 is a partial enlarged plan view of the Y electrodes.

FIG. 5 is an enlarged view of the Y electrodes 14. FIG. 5 illustrates exemplary Y electrodes 14 each including three Y fine lines 15, and illustrates first ends of two adjacent Y electrodes 14. Each of the Y fine lines 15 is shaped like a wave having an amplitude and a wavelength that is approximately 12 times as long as the amplitude. A maximum angle formed by a tangent to the wave of each Y fine line 15 and a center line of the wave is less than 45° as in the X fine line 13. The three Y fine lines 15 are aligned in the column direction and have identical shapes (spaced in the column direction) such that wave peaks are aligned.

Each Y electrode 14 includes a plurality of Y auxiliary lines 15a connecting adjacent Y fine lines 15 such that the Y auxiliary lines 15a are arranged between the three Y fine lines 15. The Y fine lines 15 are wavy lines, whereas the Y auxiliary lines 15a are straight lines. The Y auxiliary lines 15a each connect the adjacent Y fine lines 15. This ensures conduction of the Y electrode 14 if at least part of the Y fine lines 15 is broken. The Y auxiliary lines 15a are not arranged between two adjacent Y fine lines 15 that are included in different Y electrodes 14. The reason is as follows. If the Y auxiliary lines 15a were arranged between these Y fine lines 15, the different Y electrodes 14 would be brought into conduction with each other, so that position detection for each Y electrode 14 might fail. In FIG. 5, the Y fine lines 15 and the Y auxiliary lines 15a are depicted as broken lines such that these lines can be distinguished from the X fine lines 13 and the X auxiliary lines 13a. The actual Y fine lines 15 and the actual Y auxiliary lines 15a are continuous fine lines. The same applies to the other figures.

Figure 6:
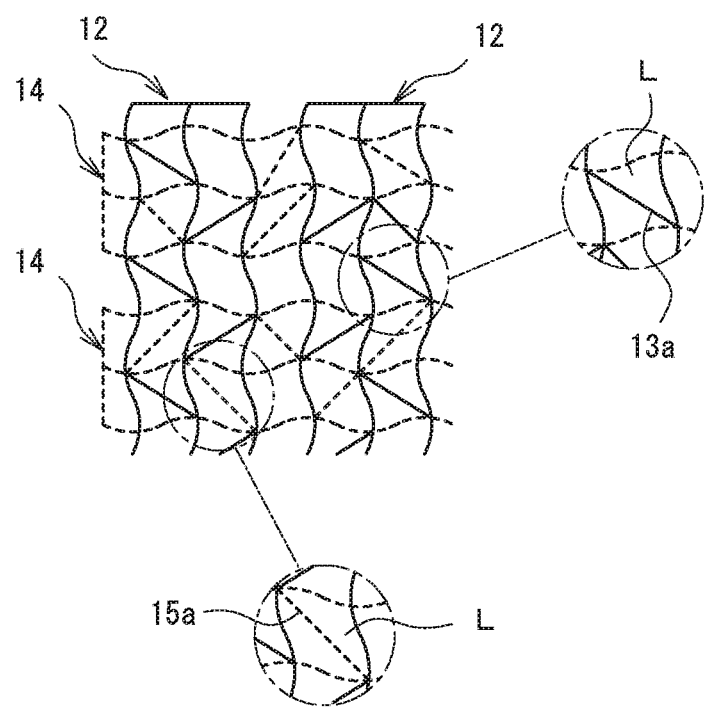
FIG. 6 includes partial enlarged plan views of the X electrodes and the Y electrodes arranged in a superposed manner.

FIG. 6 illustrates the X electrodes 12, illustrated in FIG. 4, arranged on the front surface 11a of the base film 11 and the Y electrodes 14, illustrated in FIG. 5, arranged on the rear surface 11b of the base film 11. In other words, FIG. 6 illustrates, in plan view, the X electrodes 12 and the Y electrodes 14 arranged in a superposed manner. As illustrated in FIG. 6, two adjacent X fine lines 13 intersect two adjacent Y fine lines 15, thus defining a quadrangular cell L. In FIG. 6, six X fine lines 13 and six Y fine lines 15 define a plurality of cells L in a matrix of five rows by five columns. The shape of each cell L depends on the shape of the X fine line 13 and that of the Y fine line 15. In a case where both the X fine line 13 and the Y fine line 15 are straight lines, the cell L has a quadrangular shape with four straight sides. In this embodiment in which both the X fine line 13 and the Y fine line 15 are wavy lines, the cell L has a quadrangular shape with four curved sides.

As illustrated in FIG. 6, the X auxiliary lines 13a and the Y auxiliary lines 15a are located on diagonals of the cells L. Although the X auxiliary lines 13a are not arranged between the adjacent X electrodes 12, the Y auxiliary lines 15a are arranged therebetween. Similarly, the Y auxiliary lines 15a are not arranged between the adjacent Y electrodes 14, but the X auxiliary lines 13a are arranged therebetween. As described above, the multiple cells L are divided into two groups, one group includes the cells L having the X auxiliary line 13a or the Y auxiliary line 15a, and the other group includes the cells L having neither the X auxiliary line 13a nor the Y auxiliary line 15a. The X auxiliary lines 13a and the Y auxiliary lines 15a are arranged so as not to occupy the same cell L. In other words, each cell L having the X auxiliary line 13a or the Y auxiliary line 15a has the X auxiliary line 13a or the Y auxiliary line 15a on one diagonal of the cell such that the X auxiliary line 13a or the Y auxiliary line 15a is not located on each of the two diagonals of the cell L. Therefore, the X auxiliary line 13a and the Y auxiliary line 15a are not located on the two diagonals of the same cell L. Furthermore, the X auxiliary line 13a and the Y auxiliary line 15a are not arranged in a superposed manner on either one of the two diagonals of the same cell L. As described above, the X auxiliary line 13a and the Y auxiliary line 15a are not arranged on the same cell L. This arrangement increases an overall aperture ratio of the capacitive touch panel 10, thus making a fine line pattern including the X electrodes 12 and the Y electrodes 14 less conspicuous.

Furthermore, the cells L on upper, lower, right, and left sides of each cell L having the X auxiliary line 13a or the Y auxiliary line 15a have neither the X auxiliary line 13a nor the Y auxiliary line 15a. In addition, the X auxiliary lines 13a are not of only one kind, or do not extend in the same direction, and the Y auxiliary lines 15a are not of only one kind, or do not extend in the same direction. The X auxiliary lines 13a and the Y auxiliary lines 15a extend in different directions (or on the diagonals extending in different directions). This arrangement disturbs regularity of the fine line pattern including the X electrodes 12 and the Y electrodes 14, thus effectively reducing a moiré pattern.

The X fine lines 13 and the Y fine lines 15, which are curve lines, have a more complex shape than straight X and Y fine lines. Unfortunately, the wavy fine lines are likely to vary in width when formed by screen printing. A narrow width increases the risk of breaking of such a fine line. The above-described X auxiliary lines 13a and Y auxiliary lines 15a reduce the risk of conduction failure caused by breaking of a fine line and maintain stable conduction. The X fine lines 13 and the Y fine lines 15 are curve lines, whereas the X auxiliary lines 13a and the Y auxiliary lines 15a are straight lines. The X auxiliary lines 13a and the Y auxiliary lines 15a, which have a shape different from that of the X fine lines 13 and the Y fine lines 15, disturb the regularity of the fine line pattern, contributing to the reduction of the moiré pattern. The X auxiliary lines 13a and the Y auxiliary lines 15a may be curves or wavy lines, or do not necessarily have to be straight lines.

Furthermore, the X auxiliary lines 13a and the Y auxiliary lines 15a also function to adjust an apparent aperture ratio of the wiring pattern including the X electrodes 12 and the Y electrodes 14. The wiring pattern includes the X fine lines 13, the Y fine lines 15, the X auxiliary lines 13a, and the Y auxiliary lines 15a. Such a configuration allows the capacitive touch panel 10 to have an appropriate aperture ratio, and prevents a too low aperture ratio that causes intersections of the X fine lines 13 and the Y fine lines to appear to have a large width and a too high aperture ratio that enhances a contrast between portions having the X fine lines 13 and the Y fine lines 15 and portions having no X fine lines 13 and no Y fine lines 15 and thus makes the X fine lines 13 and the Y fine lines 15 more conspicuous.

Figure 7:
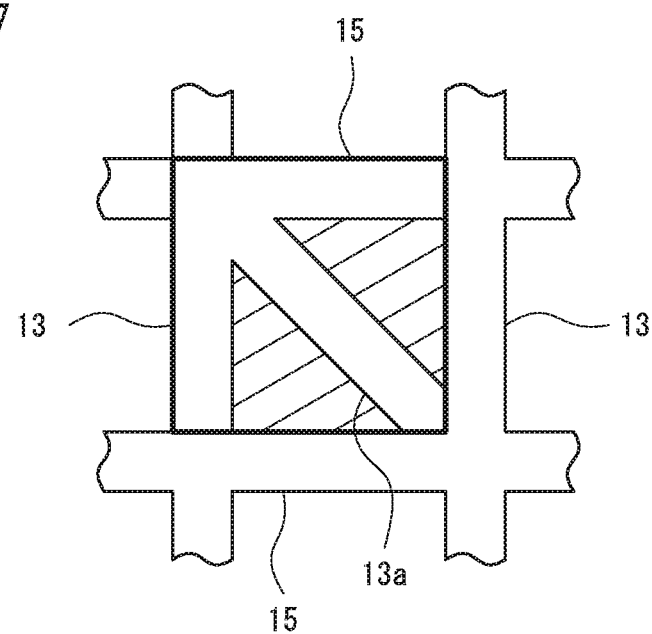
FIG. 7 is a diagram explaining an aperture ratio.

The term "aperture ratio" refers to the ratio of an aperture other than the X fine line 13, the Y fine line 15, the X auxiliary line 13a, and the Y auxiliary line 15a (and a dummy X auxiliary line 23b and a dummy Y auxiliary line 35b, which will be described later) to one cell L. Because the aperture ratio varies from one cell L to another, a mean value of aperture ratios of all of the cells L in the capacitive touch panel 10 is used to represent the aperture ratio of the capacitive touch panel 10. In this case, the X fine lines 13 and the Y fine lines 15 are regarded as straight lines. As illustrated in FIG. 7, the area of two hatched triangles is obtained by subtracting the area of the X fine line 13, that of the Y fine line 15, and that of the X auxiliary line 13a from the area of one cell L depicted as a thick-line square. The aperture ratio is the ratio of the area of the two hatched triangles to the area of the cell L. The aperture ratio can be computed by using, for example, general-purpose computer-aided design (CAD) software.

Each of the X auxiliary lines 13a and the Y auxiliary lines 15a is disposed such that opposite ends of the auxiliary line are positioned at the intersections of the X fine lines 13 and the Y fine lines 15. This arrangement makes the ends of the X auxiliary lines 13a and the Y auxiliary lines 15a less conspicuous and thus eliminates a reduction in viewability.

For a material for the X fine lines 13, the Y fine lines 15, the X auxiliary lines 13a, the Y auxiliary lines 15a, and the wiring lines 16, silver, gold, copper, aluminum, or any of alloys of these metals can be used. A paste containing resin and a conductive material, such as metal, dispersed in the resin may be used. Silver paste containing resin and silver dispersed in the resin is highly conductive and is preferably used.

Furthermore, the X fine lines 13, the Y fine lines 15, the X auxiliary lines 13a, the Y auxiliary lines 15a, the dummy X auxiliary lines 23b, and the dummy Y auxiliary lines 35b preferably have a width of 1 to 60 µm. A width of less than 1 µm indicates that the lines are too thin and the stability of pattern printing may decrease. A width of greater than 60 µm indicates that the lines are too thick and the viewability may decrease such that the individual fine lines including the X fine lines 13 are clearly visible. For these reasons, the lines have a width more preferably ranging from 25 to 45 µm.

For the base film 11, a highly transparent resin film is used. Examples of such a material include PET (polyethylene terephthalate), polyethylene naphthalate resin (PEN), polycarbonate resin (PC), methacrylic resin (PMMA), polypropylene resin (PP), polyurethane resin (PU), polyamide resin (PA), polyether sulfone resin (PES), polyether ether ketone resin (PEEK), triacetyl cellulose resin (TAC), and cycloolefin polymer (COP).

The base film 11 has a thickness of preferably 50 µm to 250 µm. A thickness of less than 50 µm indicates that the base film 11 exhibits poor strength when bonded to an object, such as a device, while being bent to be fitted over the object. This may cause the base film 11 to be broken. A thickness of greater than 250 µm indicates that the base film 11 exhibits poor flexibility when bonded to an object, such as a device, while being bent to be fitted over the object. This may reduce the ease with which the film can be fitted over the object. For these reasons, the thickness of the base film 11 more preferably ranges from 100 µm to 200 µm in view of handling the base film 11.

The resist layers 19 are used to protect, for example, the base film 11, the X electrodes 12, the Y electrodes 14, and the wiring lines 16x and 16y from scratching, for example. The resist layers 19 can be made of a typical insulating rigid resin. Examples of such a material include acrylic, urethane, epoxy, polyolefin, and other resins. The resist layers 19 may contain an ultraviolet (UV) absorber and serve as a layer for protection against UV rays. The resist layers 19 may be made of polyurethane-polyurea resin and serve as an anti-sulfuration layer for preventing sulfuration of, for example, the X electrodes 12, the Y electrodes 14, and the wiring lines 16x and 16y.

To fabricate the capacitive touch panel 10, for example, silver paste is applied to the front surface 11a of the base film 11 by screen printing, thereby forming the X electrodes 12 and the wiring lines 16x and 16y. Additionally, for example, silver paste is applied to the rear surface 11b of the base film 11 by screen printing, thereby forming the Y electrodes 14 and the wiring lines 16y. The through-holes 11c are formed in the base film 11. After that, the wiring lines 16y on the front surface 11a of the base film 11 are brought into conduction with the wiring lines 16y on the rear surface 11b thereof. Thus, the capacitive touch panel 10 is fabricated. The through-holes 11c can be formed either before or after screen printing. The X electrodes 12, the Y electrodes 14, and the wiring lines 16x and 16y can be formed by, for example, gravure printing, offset printing, or photolithography, instead of screen printing.

The aperture ratio of a portion where the X electrodes 12 and the Y electrodes 14 are arranged in the capacitive touch panel 10 preferably ranges from 90.0% to 99.8%, more preferably ranges from 94% to 97%. An aperture ratio of less than 90% indicates that the intersections of the X fine lines 13 and the Y fine lines 15 tend to appear thick and the X fine lines 13 and the Y fine lines 15 may be conspicuous. In contrast, an aperture ratio of greater than 99.8% indicates that each of the X fine lines 13 and the Y fine lines 15 tends to appear thick and the X fine lines 13 and the Y fine lines 15 may be conspicuous. At an aperture ratio ranging from 94% to 97%, the X fine lines 13 and the Y fine lines 15 are less conspicuous.

The X auxiliary lines 13a and the Y auxiliary lines 15a are formed as straight lines inclined at 45° or 135° in plan view. This allows a pattern (hereinafter, also referred to as a "fine-line pattern") formed by the X fine lines 13 and the Y fine lines 15 arranged in a superposed manner to be less complex, or simpler, than that in a case where the X auxiliary lines 13a and the Y auxiliary lines 15a are formed as straight lines inclined at 35° or 60° in plan view. This is advantageous in view of mass production of the capacitive touch panel 10.

Figure 8:
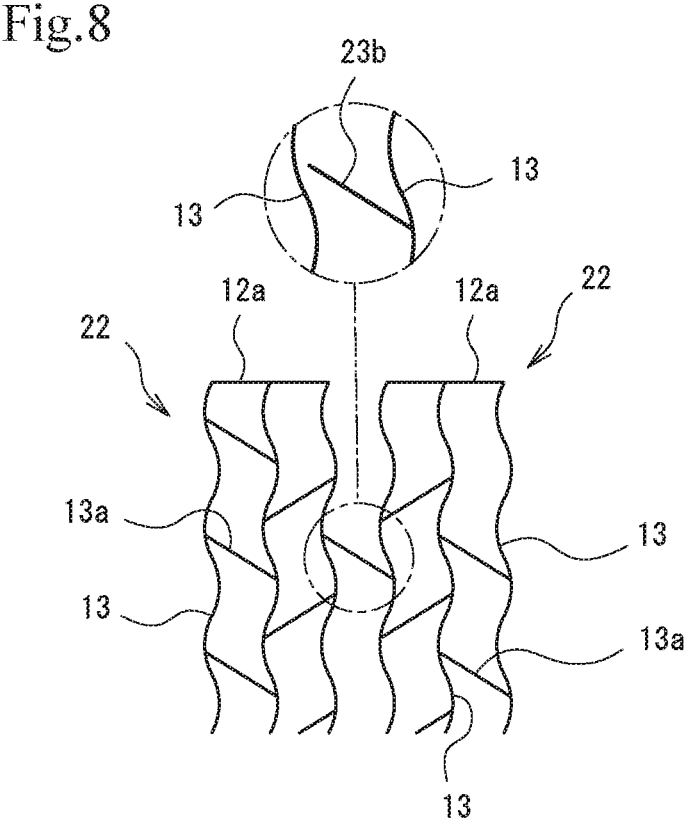
FIG. 8 includes partial enlarged plan views of X electrodes in another embodiment and corresponds to FIG. 4.
Figure 9:
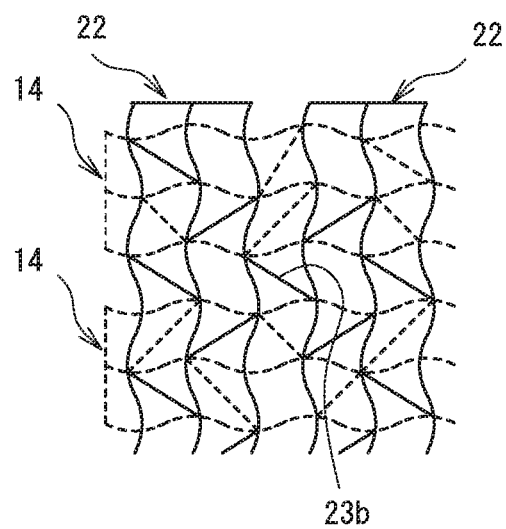
FIG. 9 is a partial enlarged plan view of the X electrodes of FIG. 8 and the Y electrodes of FIG. 5 arranged in a superposed manner and corresponds to FIG. 6.

Second Embodiment [FIGS. 8 and 9]

FIG. 8 includes enlarged views of X electrodes 22 in a second embodiment. FIG. 8 illustrates an example in which each X electrode 22 includes three X fine lines 13, and also illustrates first ends of two X electrodes 22. The X fine lines 13 are the same as those in the foregoing embodiment. A plurality of dummy X auxiliary lines 23b, which appear to connect adjacent X fine lines 13, are arranged between the X fine lines 13 included in the left X electrode 22 and those included in the right X electrode 22. FIG. 8 illustrates one dummy X auxiliary line 23b. The dummy X auxiliary lines 23b are also straight lines. As illustrated in a partial enlarged view in FIG. 8, the dummy X auxiliary line 23b has a right end connected to the X fine line 13 and a left end, which is not connected to the X fine line 13. The left end of the dummy X auxiliary line 23b extends toward and is located in close proximity to the X fine line 13. Since the dummy X auxiliary line 23b does not connect the adjacent X fine lines 13, the adjacent X electrodes 12 are not in conduction with each other. The dummy X auxiliary line 23b may be a curve or a wavy line, or does not necessarily have to be a straight line.

FIG. 9 illustrates the X electrodes 22, illustrated in FIG. 8, arranged on the front surface 11a of the base film 11 and the Y electrodes 14, illustrated in FIG. 5 described in the first embodiment, arranged on the rear surface 11b of the base film 11. In other words, FIG. 9 illustrates, in plan view, the X electrodes 22 and the Y electrodes 14 arranged in a superposed manner. Unlike the wiring pattern in FIG. 6, a wiring pattern including the X electrodes 22 and the Y electrodes 14 in FIG. 9 includes the dummy X auxiliary line 23b in the cells L arranged in a matrix of three rows by three columns. The wiring pattern in FIG. 9 is the same as that in FIG. 6 except for the dummy X auxiliary line 23b.

In a capacitive touch panel 10 according to the second embodiment, the arranged dummy X auxiliary lines 23b reduce the number of cells L having neither the X auxiliary line 13a nor the Y auxiliary line 15a and substitute for the X auxiliary lines 13a and the Y auxiliary lines 15a to adjust viewability. Therefore, the added dummy X auxiliary lines 23b can compensate for a shortage of the X auxiliary lines 13a and the Y auxiliary lines 15b to reduce or eliminate the occurrence of a moiré pattern and adjust the aperture ratio to an appropriate value.

Figure 10:
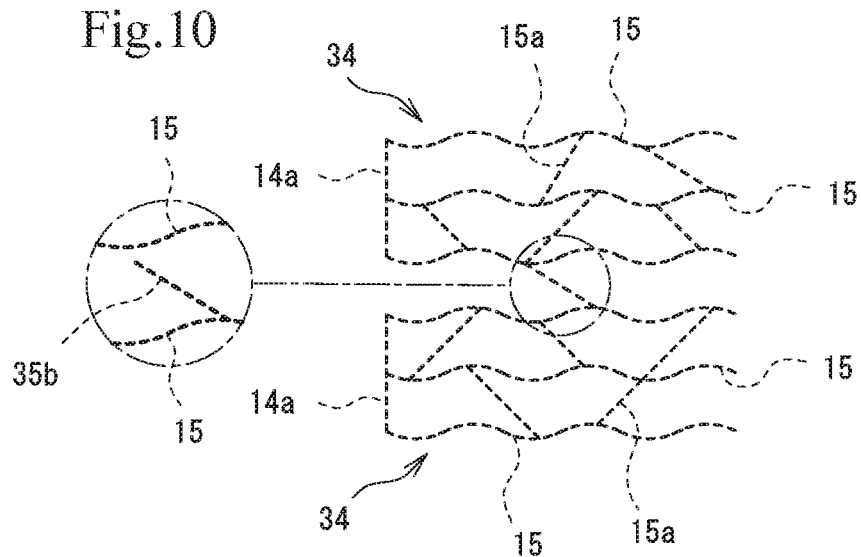
FIG. 10 includes partial enlarged plan views of Y electrodes in another embodiment and corresponds to FIG. 5.
Figure 11:
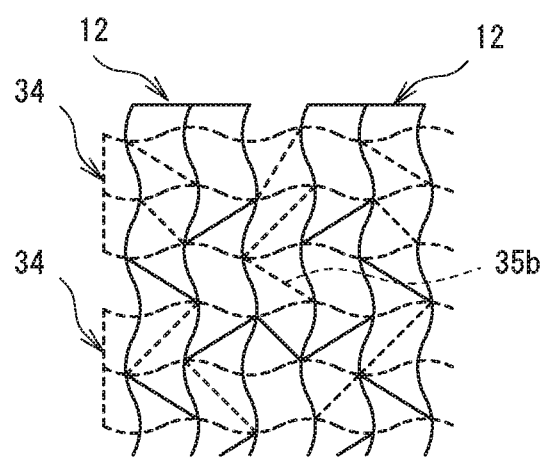
FIG. 11 is a partial enlarged plan view of the X electrodes of FIG. 4 and the Y electrodes of FIG. 10 arranged in a superposed manner and corresponds to FIG. 6.

Third Embodiment [FIGS. 10 and 11]

FIG. 10 includes enlarged views of Y electrodes 34 in a third embodiment. FIG. 10 illustrates an example in which each Y electrode 34 includes three Y fine lines 15, and also illustrates first ends of two Y electrodes 34. The Y fine lines 15 are the same as those in the foregoing embodiments. A plurality of dummy Y auxiliary lines 35b, which appear to connect adjacent Y fine lines 15, are arranged between the Y fine lines 15 included in the left Y electrode 34 and those included in the right Y electrode 34. FIG. 10 illustrates one dummy Y auxiliary line 35b. The dummy Y auxiliary lines 35b are also straight lines. As illustrated in a partial enlarged view in FIG. 10, the dummy Y auxiliary line 35b has a lower end connected to the Y fine line 15 and an upper end, which is not connected to the Y fine line 15. The upper end of the dummy Y auxiliary line 35b extends toward and is located in close proximity to the Y fine line 15. Since the dummy Y auxiliary line 35b does not connect the adjacent Y fine lines 15, the adjacent Y electrodes 34 are not in conduction with each other. The dummy Y auxiliary line 35b may be a curve or a wavy line, or does not necessarily have to be a straight line.

FIG. 11 illustrates the X electrodes 12, illustrated in FIG. 4 described in the first embodiment, arranged on the front surface 11a of the base film 11 and the Y electrodes 34, illustrated in FIG. 10, arranged on the rear surface 11b of the base film 11. In other words, FIG. 11 illustrates, in plan view, the X electrodes 12 and the Y electrodes 34 arranged in a superposed manner. A wiring pattern including the X electrodes 12 and the Y electrodes 34 in FIG. 11 is similar to the wiring pattern in FIG. 9 but includes the dummy Y auxiliary line 35b in the cells L arranged in a matrix of three rows by three columns.

In a capacitive touch panel 10 according to the third embodiment, the arranged dummy Y auxiliary lines 25b reduce the number of cells L having neither the X auxiliary line 13a nor the Y auxiliary line 15a and substitute for the X auxiliary lines 13a and the Y auxiliary lines 15a to adjust viewability. Therefore, the added dummy Y auxiliary lines 25b can compensate for a shortage of the X auxiliary lines 13a and the Y auxiliary lines 15b to reduce or eliminate the occurrence of a moiré pattern and adjust the aperture ratio to an appropriate value.

The above-described embodiments are illustrative examples of the present invention. For example, the embodiments can be modified or changed, known techniques in the art can be added to the embodiments, and the embodiments can be combined without departing from the sprit and scope of the present invention. Such techniques are also within the scope of the present invention.

For example, each of the X electrodes 12 may include any number of X fine lines 13 and each of the Y electrodes 14 may include any number of Y fine lines 15. The distance between the adjacent X fine lines 13 included in one X electrode 12 or 22 can be different from, but is preferably the same as, that in another X electrode 12 or 22. The reason why the distance between the adjacent X fine lines 13 included in one X electrode 12 or 22 is preferably the same as that in another X electrode 12 or 22 is that this arrangement reduces the likelihood of occurrence of a moiré pattern and facilitates formation of the auxiliary lines. The same applies to the Y electrodes 14 and 34.

In the above-described exemplary embodiments, the X electrodes 12 and the Y electrodes 14 are arranged in a superposed manner such that the peaks of the waveforms of the X fine lines 13 are aligned with the peaks of the waveforms of the Y fine lines 15. The arrangement is not limited to this example. The peaks of the waveforms of the X fine lines 13 can be aligned with parts other than the peaks of the waveforms of the Y fine lines 15. Such a modification allows the X auxiliary lines 13a and the Y auxiliary lines 15a to be inclined at an angle other than 45° in plan view.

The capacitive touch panel 10 according to the first embodiment included in the above-described embodiments can be a capacitive touch panel 10 that includes the X electrodes 22 including the dummy X auxiliary lines 23b described in the second embodiment and the Y electrodes 34 including the dummy Y auxiliary lines 35b described in the third embodiment.

Although any of the X auxiliary line 13a, the Y auxiliary line 15a, the dummy X auxiliary line 23b, and the dummy Y auxiliary line 35b is disposed in each cell L having the auxiliary line in the above-described embodiments, these auxiliary lines can be arranged in a superposed manner or an overlapping manner in each cell L having the auxiliary line. However, the auxiliary lines arranged on different diagonals of one cell L would reduce the aperture ratio. Furthermore, the auxiliary lines arranged on the same diagonal of one cell L would appear thick. For these reasons, it is preferred that any one of these auxiliary lines be disposed in each cell L having the auxiliary line.

EXAMPLES

Example 1: Method of Making Capacitive Touch Panel

A capacitive touch panel including a PET film (base film) having a longitudinal dimension of 109 mm, a lateral dimension of 174 mm, and a thickness of 100 μm, 30 X electrodes on a front surface of the PET film, and 19 Y electrodes on a rear surface thereof was made as follows. The PET film was placed in a screen printer, and a fine-line pattern including the electrodes each including three fine lines (the X fine lines 13 in FIG. 4, the Y fine lines 15 in FIG. 5) and auxiliary lines (the X auxiliary lines 13a in FIG. 4, the Y auxiliary lines 15a in FIG. 5) was formed on the PET film by screen printing (refer to FIG. 6) such that the fine lines each had a width of 26 μm, the distance between the fine lines was 1894 μm, and each fine line was shaped like a wave having an amplitude of 180 μm and a wavelength of 2880 μm. This printing was performed such that the X electrodes were formed on the front surface of the PET film and the Y electrodes were then formed on the rear surface of the PET film. After that, resist ink was applied to both the surfaces, having the electrodes, of the PET film to insulate both the surfaces of the PET film. The capacitive touch panel was made in the above-described manner.

Example 2: Evaluation of Occurrence of Moiré Pattern and Viewability

To evaluate the occurrence of a moiré pattern and viewability, samples 1 to 8 were made. Each of the samples had a fine-line pattern including fine lines and auxiliary lines or a fine-line pattern including fine lines, auxiliary lines, and dummy auxiliary lines. These samples 1 to 8 included X electrodes each including four X fine lines and Y electrodes each including four Y fine lines and the distance between the fine lines was 1414 μm. The samples were made by using the same method as that in EXAMPLE 1, except that the dummy auxiliary lines were added. The auxiliary and dummy auxiliary lines, which will be described later, were formed by printing simultaneously with the fine lines. FIGS. 12 to 19 illustrate portions including eight X fine lines and eight Y fine lines of these samples.

Figure 12A:
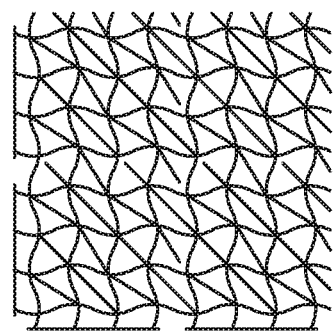
FIG. 12 illustrates an example of a wiring pattern and includes plan views of a sample 1, part (a) illustrates X electrodes and Y electrodes represented by solid lines, part (b) illustrates the Y electrodes in part (a) represented by broken lines, part (c) illustrates the X electrodes, and part (d) illustrates the Y electrodes.
Figure 12B:
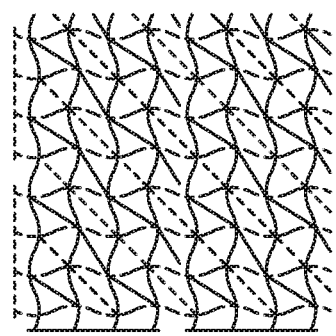
Figure 12C:
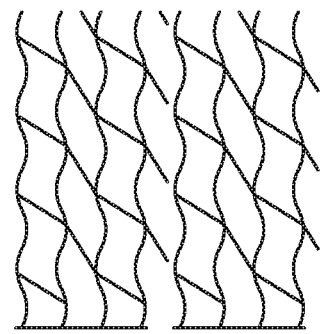
Figure 12D:
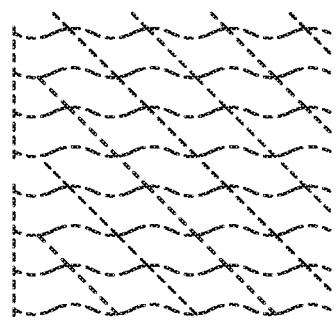

The sample 1 was formed to have a wiring pattern, as illustrated in FIG. 12(a), obtained by superposition of the X and Y electrodes and the dummy auxiliary lines arranged between the fine lines included in different electrodes. Specifically, the auxiliary lines are arranged in all cells and all of the auxiliary lines are directed in the same direction. In FIG. 12(a), all of the lines are represented by solid lines to illustrate the wiring pattern. FIG. 12(a) illustrates the wiring pattern including the fine lines of the X electrodes in FIG. 12(c) and the fine lines of the Y electrodes in FIG. 12(d). FIG. 12(b) illustrates a wiring pattern obtained by superposition of the X electrodes and the Y electrodes including the fine lines represented by broken lines to clarify whether each auxiliary line or dummy auxiliary line is included in the X electrode or the Y electrode.

Figure 13A:
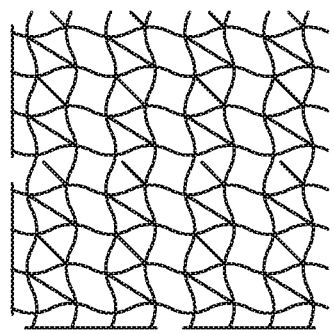
FIG. 13 illustrates an example of a wiring pattern and includes plan views of a sample 2, part (a) illustrates X electrodes and Y electrodes represented by solid lines, part (b) illustrates the Y electrodes in part (a) represented by broken lines, part (c) illustrates the X electrodes, and part (d) illustrates the Y electrodes.
Figure 13B:
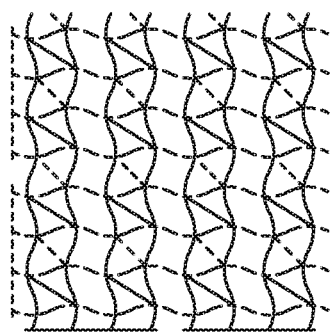
Figure 13C:
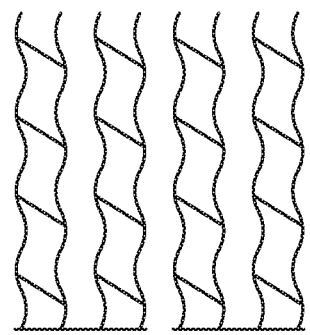
Figure 13D:
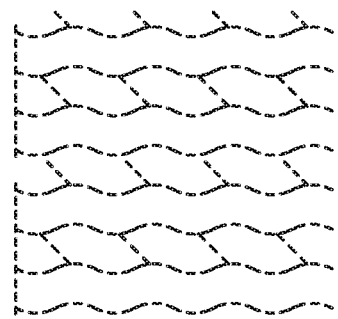

The sample 2 was formed to have a wiring pattern, as illustrated in FIG. 13(a), obtained by superposition of the X and Y electrodes and the dummy auxiliary lines arranged between the fine lines included in different electrodes. Specifically, the auxiliary lines are arranged in every other column. All of the auxiliary lines are directed in the same direction. The relation between parts (a) to (d) of FIG. 13 is similar to that between parts (a) to (d) of FIG. 12 illustrating the sample 1.

Figure 14A:
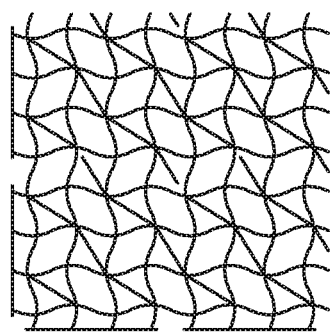
FIG. 14 illustrates an example of a wiring pattern and includes plan views of a sample 3, part (a) illustrates X electrodes and Y electrodes represented by solid lines, part (b) illustrates the Y electrodes in part (a) represented by broken lines, part (c) illustrates the X electrodes, and part (d) illustrates the Y electrodes.
Figure 14B:
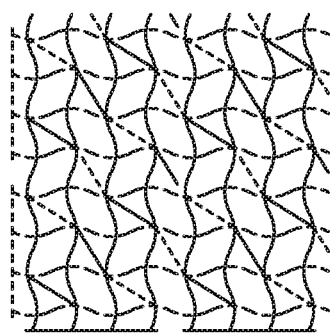
Figure 14C:
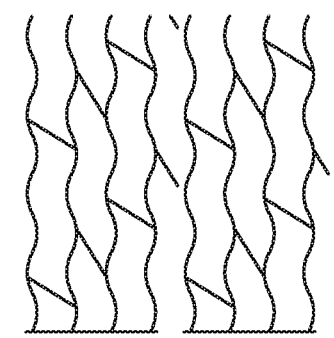
Figure 14D:
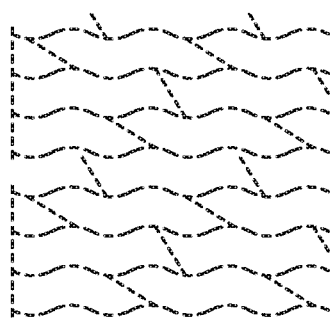

The sample 3 was formed to have a wiring pattern, as illustrated in FIG. 14(a), obtained by superposition of the X and Y electrodes and the dummy auxiliary lines arranged between the fine lines included in different electrodes. Specifically, the auxiliary line is disposed in every other cell in each column and in each row such that the cells on upper, lower, right, and left sides of each cell having the auxiliary line or the dummy auxiliary line have neither the auxiliary line nor the dummy auxiliary line. All of the auxiliary lines and the dummy auxiliary lines are directed in the same directions. The relation between parts (a) to (d) of FIG. 14 is similar to that between parts (a) to (d) of FIG. 12 illustrating the sample 1.

Figure 15A:
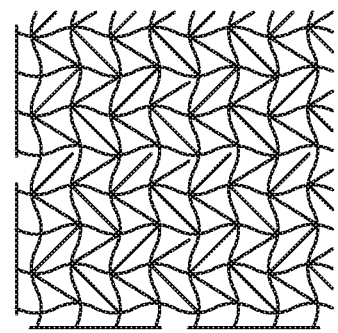
FIG. 15 illustrates an example of a wiring pattern and includes plan views of a sample 4, part (a) illustrates X electrodes and Y electrodes represented by solid lines, part (b) illustrates the Y electrodes in part (a) represented by broken lines, part (c) illustrates the X electrodes, and part (d) illustrates the Y electrodes.
Figure 15B:
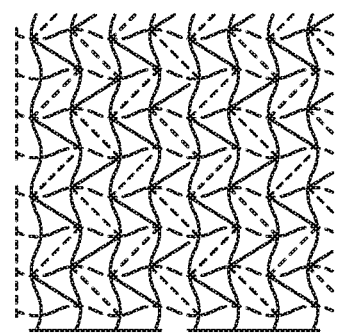
Figure 15C:
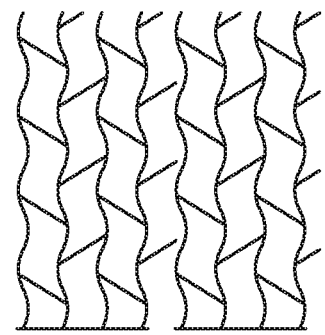
Figure 15D:
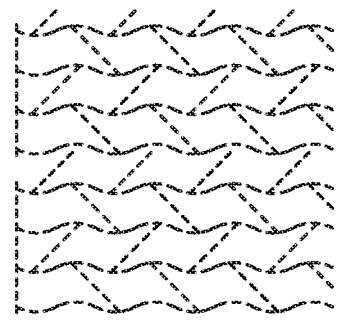

The sample 4 was formed to have a wiring pattern, as illustrated in FIG. 15(a), obtained by superposition of the X and Y electrodes and the auxiliary lines arranged between the fine lines included in different electrodes. Specifically, each cell has the auxiliary line or the dummy auxiliary line such that each of the auxiliary lines and the dummy auxiliary lines is directed in any of two directions. The relation between parts (a) to (d) of FIG. 15 is similar to that between parts (a) to (d) of FIG. 12 illustrating the sample 1.

Figure 16A:
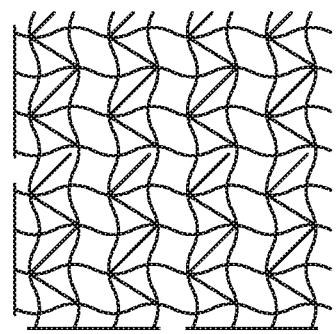
FIG. 16 illustrates an example of a wiring pattern and includes plan views of a sample 5, part (a) illustrates X electrodes and Y electrodes represented by solid lines, part (b) illustrates the Y electrodes in part (a) represented by broken lines, part (c) illustrates the X electrodes, and part (d) illustrates the Y electrodes.
Figure 16B:
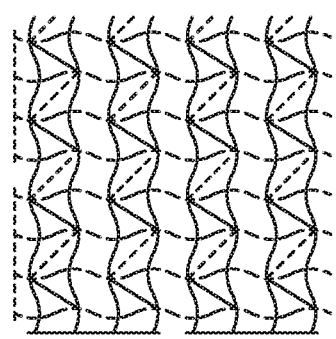
Figure 16C:
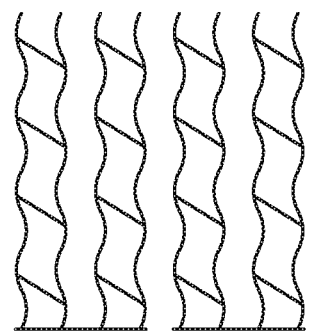
Figure 16D:
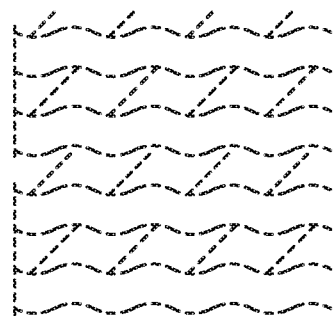

The sample 5 was formed to have a wiring pattern, as illustrated in FIG. 16(a), obtained by superposition of the X and Y electrodes and the dummy auxiliary lines arranged between the fine lines included in different electrodes. Specifically, the auxiliary lines or the dummy auxiliary lines are arranged in every other column. Each of the auxiliary lines and the dummy auxiliary lines extends along any of two diagonals. The relation between parts (a) to (d) of FIG. 16 is similar to that between parts (a) to (d) of FIG. 12 illustrating the sample 1.

Figure 17A:
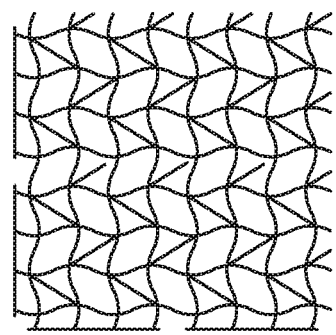
FIG. 17 illustrates an example of a wiring pattern and includes plan views of a sample 6, part (a) illustrates X electrodes and Y electrodes represented by solid lines, part (b) illustrates the Y electrodes in part (a) represented by broken lines, part (c) illustrates the X electrodes, and part (d) illustrates the Y electrodes.
Figure 17B:
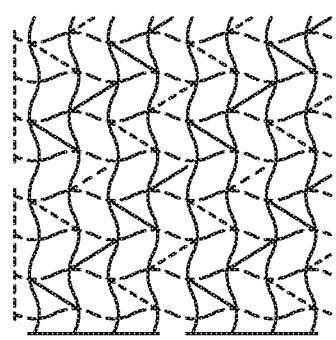
Figure 17C:
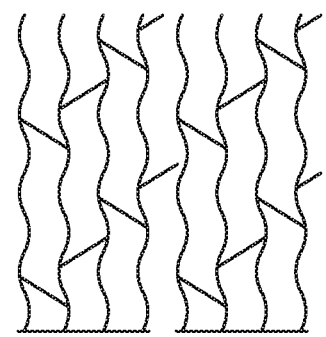
Figure 17D:
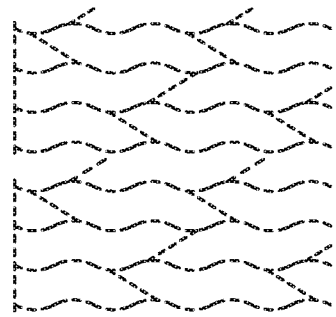
Figure 18A:
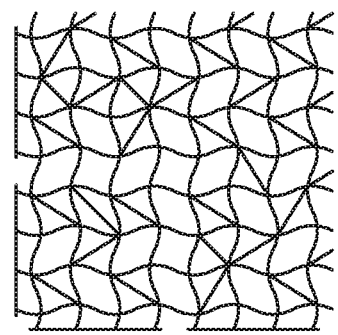
FIG. 18 illustrates an example of a wiring pattern and includes plan views of a sample 7, part (a) illustrates X electrodes and Y electrodes represented by solid lines, part (b) illustrates the Y electrodes in part (a) represented by broken lines, part (c) illustrates the X electrodes, and part (d) illustrates the Y electrodes.
Figure 18B:
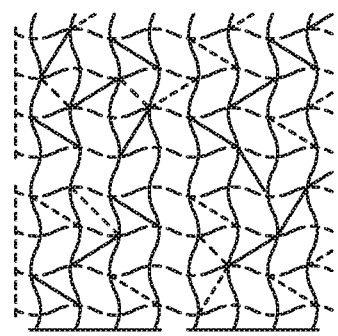
Figure 18C:
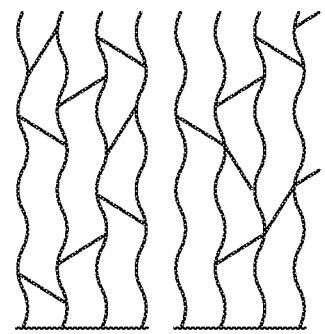
Figure 18D:
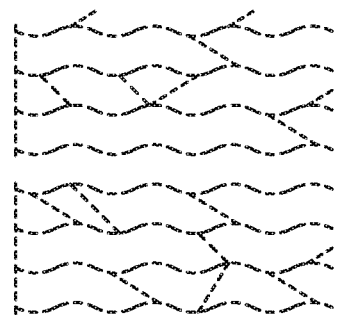
Figure 19A:
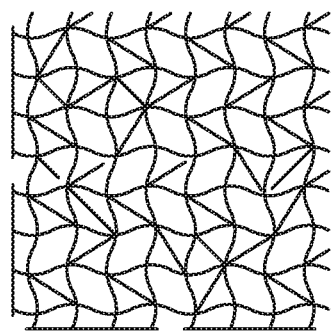
FIG. 19 illustrates an example of a wiring pattern and includes plan views of a sample 8, part (a) illustrates X electrodes and Y electrodes represented by solid lines, part (b) illustrates the Y electrodes in part (a) represented by broken lines, part (c) illustrates the X electrodes, and part (d) illustrates the Y electrodes.
Figure 19B:
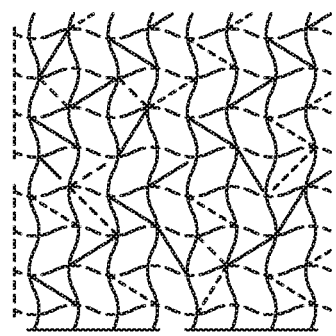
Figure 19C:
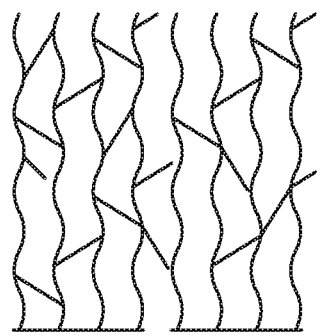
Figure 19D:
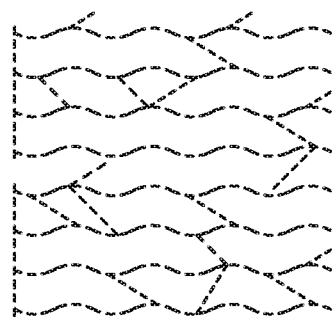

The sample 6 was formed to have a wiring pattern, as illustrated in FIG. 17(a), obtained by superposition of the X and Y electrodes and the dummy auxiliary lines arranged between the fine lines included in different electrodes. Specifically, the auxiliary line or the dummy auxiliary line is disposed in every other cell in each column and in each row such that the cells on upper, lower, right, and left sides of each cell having the auxiliary line or the dummy auxiliary line have neither the auxiliary line nor the dummy auxiliary line. Each of the auxiliary lines and the dummy auxiliary lines extends along any of two diagonals. The relation between parts (a) to (d) of FIG. 17 is similar to that between parts (a) to (d) of FIG. 12 illustrating the sample 1.

The sample 7 including no dummy auxiliary lines connecting different X electrodes and no dummy auxiliary lines connecting different Y electrodes was formed to have a wiring pattern obtained by superposition of the X and Y electrodes, the auxiliary lines each connecting the components of the same X electrode, and the auxiliary lines each connecting the components of the same Y electrode such that cells having the auxiliary line and cells having no auxiliary line were arranged in each row and in each column in a manner similar to that in the pattern of FIG. 6. The auxiliary lines are directed in any of two directions. The relation between parts (a) to (d) of FIG. 18 is similar to that between parts (a) to (d) of FIG. 12 illustrating the sample 1.

The sample 8 was formed to have a wiring pattern obtained by superposition of the X and Y electrodes, the auxiliary lines each connecting the components of the same X electrode, the auxiliary lines each connecting the components of the same Y electrode, and the dummy X auxiliary lines appearing to connect different X electrodes such that cells having the auxiliary line or the dummy auxiliary line and cells having neither the auxiliary line nor the dummy auxiliary line were arranged in each row and in each column in a manner similar to that in the pattern of FIG. 9. Each of the auxiliary lines and the dummy auxiliary lines extends along any of two diagonals. The relation between parts (a) to (d) of FIG. 19 is similar to that between parts (a) to (d) of FIG. 12 illustrating the sample 1.

<Evaluation of Moiré Pattern>

Each of the samples 1 to 8 was placed on a screen of a liquid crystal display monitor, which was driven and caused to display a white color. After that, while the sample was being rotated, the presence or absence of occurrence of a moiré pattern was determined by observation. For evaluation, a sample in which no moiré pattern occurred was regarded as very good (⊚), a sample in which a moiré pattern occurred but was completely inconspicuous, or acceptable, was regarded as good (○), a sample in which a moiré pattern occurred but was acceptable was regarded as fair (Δ), and a sample in which a conspicuous moiré pattern occurred was regarded as poor (x). The following table illustrates the results.

<Evaluation of Viewability>

Each of the samples 1 to 8 was placed on the screen of the liquid crystal display monitor, which was driven and caused to display a white color. The degree of inconspicuousness of the fine lines, the auxiliary lines, and the dummy auxiliary lines was determined by observation. For evaluation, a sample in which these lines were inconspicuous was regarded as very good (⊚), a sample in which these lines were hardly conspicuous was regarded as good (○), and a sample in which these lines were a little conspicuous was regarded as poor (x). The following table illustrates the results.

TABLE 1

| | Sample 1 | Sample 2 | Sample 3 | Sample 4 | Sample 5 | Sample 6 | Sample 7 | Sample 8 |
|---|---|---|---|---|---|---|---|---|
| Moiré Pattern | X | X | Δ | Δ | X | ○ | ⊙ | ⊙ |
| Viewability | X | ○ | ○ | X | ○ | ○ | ○ | ○ |

<Discussion>

For the moiré pattern, Table demonstrates that the samples other than the sample 1, in which the auxiliary lines extending in the same direction are arranged in all of the cells, and the samples 2 and 5, in which the cells have no auxiliary line in some of the columns regardless of the direction of the auxiliary line, are good or acceptable. For the viewability, Table demonstrates that the samples other than the samples 1 and 4, in which each cell has the auxiliary line, are practical because, for example, the fine lines were hardly conspicuous in these samples. These evaluation results in terms of two criteria, a moiré pattern and viewability, demonstrate that the sample 3 and the samples 6 to 8 are substantially free from a moiré pattern and contribute to a capacitive touch panel with good viewability because the lines, such as the fine lines, were hardly seen in these samples.

REFERENCE SIGNS LIST 10 capacitive touch panel
11 base film
11a front surface (first surface)
11b rear surface (second surface)
11c through-hole
12, 22 X electrode
12a connecting member
13 X fine line
13a X auxiliary line
23b dummy X auxiliary line
14, 34 Y electrode
14a connecting member
15 Y fine line
15a Y auxiliary line
35b dummy Y auxiliary line
16x wiring line
16y wiring line
17 connector contact
19 resist layer
R sensor region
L cell
T tangent
C center line
A maximum angle

The invention claimed is:

1. A capacitive touch panel including
a transparent insulator,
a plurality of conductive X electrodes spaced in a row direction on a first surface of the transparent insulator, and
a plurality of conductive Y electrodes spaced in a column direction on a second surface of the transparent insulator,
the X electrodes each including a plurality of X fine lines spaced in the row direction,
the Y electrodes each including a plurality of Y fine lines spaced in the column direction,
the X fine lines and the Y fine lines defining a large number of quadrangular cells arranged in a matrix of rows and columns in the transparent insulator when the transparent insulator is viewed in plan, the capacitive touch panel comprising:

an X auxiliary line disposed on a diagonal of at least one of the cells included in each row of the matrix, the X auxiliary line connecting the X fine lines that are adjacent to each other; and a Y auxiliary line disposed on a diagonal of at least one of the cells included in each column of the matrix, the Y auxiliary line connecting the Y fine lines that are adjacent to each other.

2. The capacitive touch panel according to claim 1, wherein the X auxiliary line and the Y auxiliary line are arranged in different cells of the cells.

3. The capacitive touch panel according to claim 1, wherein the X electrodes and the Y electrodes include at least one of a dummy X auxiliary line that is disposed on a diagonal of the cell having neither the X auxiliary line nor the Y auxiliary line located between adjacent X fine lines of the X fine lines of different X electrodes of the X electrodes and that does not bring the adjacent X fine lines into conduction with each other and a dummy Y auxiliary line that is disposed on a diagonal of the cell having neither the X auxiliary line nor the Y auxiliary line located between adjacent Y fine lines of the Y fine lines of different Y electrodes of the Y electrodes and that does not bring the adjacent Y fine lines into conduction with each other.

4. The capacitive touch panel according to claim 3, wherein the X auxiliary line, the Y auxiliary line, the dummy X auxiliary line, and the dummy Y auxiliary line are arranged on the diagonals of different cells of the cells.

5. The capacitive touch panel according to claim 1, wherein the cells on upper, lower, right, and left sides of each cell having the X auxiliary line or the Y auxiliary line have neither the X auxiliary line nor the Y auxiliary line.

6. The capacitive touch panel according to claim 1, wherein the X auxiliary line and the Y auxiliary line are arranged on the diagonals, each of which is one of two diagonals of the cell, extending in an identical direction.

7. The capacitive touch panel according to claim 1, wherein each of the X fine lines and the Y fine lines is shaped like a wave having an amplitude and a wavelength that is more than two times as long as the amplitude, and a tangent to the wave and a center line of the wave form a maximum angle of less than 45°.

8. The capacitive touch panel according to claim 1, wherein the X fine lines are located at positions spaced from each other in the row direction, and wherein the Y fine lines are located at positions spaced from each other in the column direction.

9. The capacitive touch panel according to claim 1, wherein the X electrodes and the Y electrodes are screen-printed products.

* * * * *